United States Patent [19]

Van Becelaere

[11] Patent Number: 4,572,240

[45] Date of Patent: Feb. 25, 1986

[54] ACCESS DOOR CONSTRUCTION

[75] Inventor: Robert M. Van Becelaere, Johnson County, Kans.

[73] Assignee: Philips Industrial Components, Inc., Dayton, Ohio

[21] Appl. No.: 584,009

[22] Filed: Feb. 27, 1984

[51] Int. Cl.⁴ .................. F16L 55/10; F16L 55/16
[52] U.S. Cl. .................... 138/92; 220/240; 49/475
[58] Field of Search ............. 138/89, 92; 220/3, 240, 220/241, 325, 378; 49/475, 485

[56] References Cited

U.S. PATENT DOCUMENTS

| | | | |
|---|---|---|---|
| 671,514 | 4/1901 | Grinsted | 138/92 X |
| 2,278,881 | 4/1942 | Jacocks | 220/3 X |
| 2,330,742 | 9/1943 | Poupitch | 220/240 |
| 2,457,066 | 12/1948 | Pepersack | 220/240 X |
| 3,211,322 | 10/1965 | Collons | 220/240 |
| 3,378,956 | 4/1968 | Parks et al. | 49/485 |
| 3,509,592 | 5/1970 | Schrock | 49/485 |
| 3,724,505 | 4/1973 | Jahn | 138/92 |
| 3,883,993 | 5/1975 | Pullan | 49/485 X |
| 4,095,640 | 6/1978 | Beckerer | 49/485 X |
| 4,202,463 | 5/1980 | Mogler | 220/240 X |

Primary Examiner—James E. Bryant, III
Attorney, Agent, or Firm—Kokjer, Kircher, Bradley, Wharton, Bowman & Johnson

[57] ABSTRACT

An access door which covers and seals an access opening in a ventilating duct. The edge of the access opening is strengthened by a dual density gasket having a U-shaped hard portion which is applied to the duct edge. A softer sealing element projects from the hard portion of the gasket and is sealed against from the inside by the door so that the duct pressure enhances the seal. The door is a sheet metal panel having a stepped configuration and a peripheral flange for contact with the seal elements. The door is held over the access opening by retainer straps having adjustment screws.

15 Claims, 4 Drawing Figures

ACCESS DOOR CONSTRUCTION

BACKGROUND OF THE INVENTION

This invention relates to doors which serve to open and close access openings formed in ventilating ducts.

The sheet metal ducts which distribute air in buildings for heating, cooling and ventilation are normally provided with access openings at various locations so that the interior of the ductwork is accessible. In order to prevent "chattering" and other objectionable noise in the vicinity of the access openings, current practice requires that the edge of each opening be equipped with a rigid metal frame which is bolted or otherwise fastened to the duct to reinforce the thin edge of the access opening. Each access opening is provided with a door which is normally held closed against the frame by one or more door latches.

The door itself must be able to withstand the duct pressures without chattering or otherwise generating excessive noise, and the door must also be effectively sealed to the duct in order to prevent leakage. Normally, the door is mounted on the outside of the duct where the duct pressure tends to break the seal between the door and duct. As a result, it is necessary to either tolerate air leakage or provide elaborate and expensive seals along with door latches which are capable of holding the door tightly closed on its seal against the force exerted by the air pressure in the duct.

The need for a special metal frame around each access opening and complicated seals and latches for each door has significantly increased the costs of the ductwork. The overall expense can be readily appreciated when it is recognized that the ducts in a single building each have a large number of access doors. It is thus apparent that a need exists for an access door which is more economical than those that are currently in common use.

SUMMARY OF THE INVENTION

The present invention has, as its principal goal, the provision of an access door which is constructed economically and yet is able to effectively seal the access opening of a ventilating duct. In accordance with the invention, a gasket constructed of two different materials functions both to strengthen the edge of the access opening and to provide an effective seal against the door. The gasket has a relatively hard portion which brackets the edge of the opening to reinforce it and a relatively soft portion which acts as the seal element for the access door. The provision of such a gasket eliminates the need for a rigid metal frame around the access opening and reduces the costs accordingly.

It is another important feature of the invention that the access door is fitted within the access opening and acts outwardly against the seal element. This arrangement takes advantage of the air pressure in the duct to increase the effectiveness of the seal and at the same time eliminates the need for complicated door latches. Since the door is pressed tightly against the soft sealing portion of the gasket by the duct pressure, all that is necessary is to hold the door generally in place over the access opening. Consequently, the retaining elements which retain the access door on the duct are much less complicated and less costly than the latches required by other doors.

Another feature of importance is the construction of the hard portion of the gasket in a manner to securely hold it on the edge of the access opening with the sealing element properly located to seal against the door. The hard portion of the gasket is a rigid U-shaped structure and includes parallel flanges which embrace the inside and outside surfaces of the duct and which have flexible fingers for gripping against the duct in order to retain the gasket securely in place. The flanges are connected by a rigid bight which bridges the edge of the access opening and has an extension in the form of a projecting rib which adds to its strength and rigidity.

The door is made entirely of thin sheet metal and has a stepped configuration which maximizes its strength. The door has a main panel and an offset flange on the periphery of the door for sealing against the gasket. A slanted wall is integral with and connects the main panel and the peripheral flange. Larger doors can be provided with stamped ribs or bosses on the main door panel to enhance its strength and rigidity.

DETAILED DESCRIPTION OF THE INVENTION

In the accompany drawing which forms a part of the specification and is to be read in conjunction therewith and in which like reference numerals are used to indicate like parts in the various views.

Figure 1:
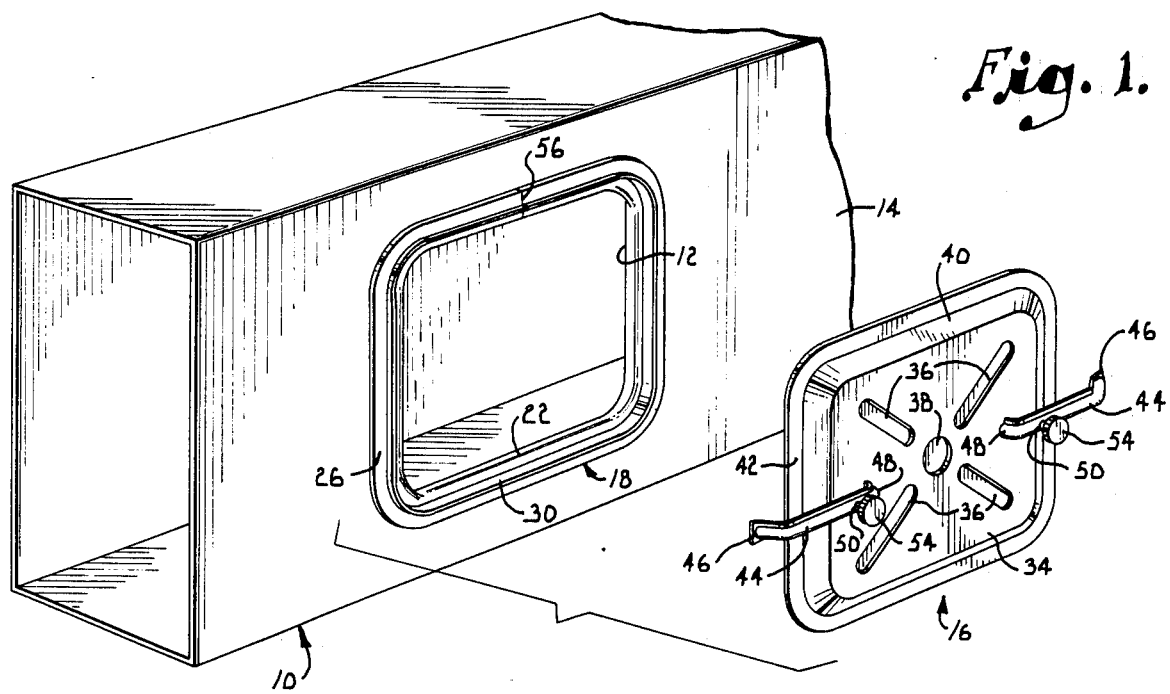
FIG. 1 is a perspective view of a ventilating duct having an access opening fitted with a gasket and equipped with an access door constructed according to a preferred embodiment of the present invention.
Figure 2:
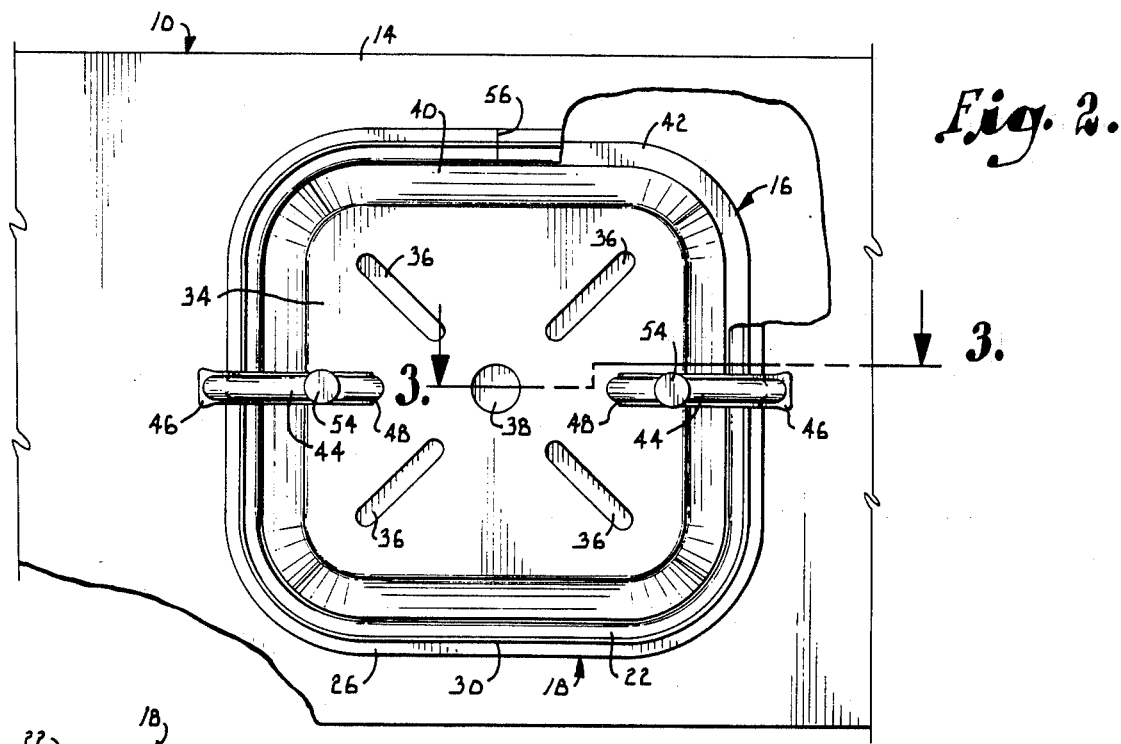
FIG. 2 is a fragmentary front elevational view showing the access door applied to the duct in the closed position, with portions of the duct and gasket broken away for purposes of illustration.

Referring now to the drawing in detail, numeral 10 designates a ventilating duct of the type used to distribute heated or cooled air in a building or for general ventilation of the building. The duct 10 is normally constructed of sheet metal and includes a plurality of interconnected walls which give the duct a rectangular configuration. The duct 10 connects with additional ducts (not shown) which distribute air throughout the building. At various locations, the ducts are provided with access openings which provide access to the interior of the ductwork. The access openings may be formed in any of the walls of the duct, and FIG. 1 shows one of the access openings 12 formed in the front wall 14 of the duct 10. Opening 12 has a generally rectangular shape, although other shapes are possible.

In accordance with the present invention, an access door 16 serves to open and close the access opening 12, and a gasket 18 is mounted on the exposed edge 12a (see FIG. 3) of the access opening to strengthen the edge 12a and provide a seal for the door 16.

Figure 4:
FIG. 4 is a sectional view on an enlarged scale taken through the gasket.

The configuration of the gasket 18 is best shown in FIG. 4. The gasket is a dual density structure having a hard portion 20 which attaches to the duct and a softer portion which extends from and is integral with the hard portion 20 to provide a seal element 22 against which door 16 can seal when closed. The hard portion 20 is generally U-shaped in section and includes a pair of parallel flanges 24 and 26 which are connected by a bight portion 28. A stiffening rib 30 extends outwardly beyond the outer flange 26 and forms an extension or continuation of the bight 28. The bight 28 and rib 30 are rigid and serve to reinforce and enhance the rigidity of the thin sheet metal edge 12a which surrounds the access opening 12.

The flanges 24 and 26 are spaced apart from one another approximately the same distance as the thickness of the duct wall 14. On their facing surfaces, the flanges 24 and 26 are each provided with a plurality of flexible fingers 32 which serve to grip against the inside and outside surfaces of the duct wall 14. The fingers 32 on each flange extend away from the flange and angle toward the other flange and toward the bight 28 such that each finger intersects at an acute angle with the flange from which it extends. The free ends or tips of the fingers 32 on each flange overlap slightly with the tips of the fingers which project from the other flange.

The seal element 22 is integral with the hard portion 20 of gasket 18 and presents a hollow circular configuration in section. The wall thickness of the seal element 22 is considerably less than the wall thickness of the hard portion 20 such that the seal element 22 is softer and more flexible and resilient than the hard portion. Additionally, the seal element 22 may be formed of a less dense material which adds to its softness and flexibility. The seal element 22 connects with the hard portion 20 at the bight 28 and also at the inside flange 24. When the gasket is applied to the edge 12a of the access opening, the seal element 22 projects from the edge 12a into the duct and also into the access opening 12 to slightly decrease its effective size.

The access door 16 is formed of sheet metal and is preferably a one piece stamped member. It has a flat main panel 34 at its center. The main panel 34 may have a plurality of stiffening ribs 36 and a circular dimple or boss 38 stamped in it. The boss 38 is located at the center of panel 34, and the ribs 36 extend generally radially with respect to the central boss 38. The ribs and boss 38 stiffen and strengthen the door and are not needed for smaller doors.

The main panel 34 is generally rectangular, and an angled wall 40 slopes away from its side edges and its top and bottom edges. Extending from the opposite edge of the slanted wall 40 is a peripheral flange 42. Flange 42 occupies a plane which is parallel to and offset inwardly from the plane occupied by the main door panel 34. Flange 42 presents a planar sealing surface on its outer side which seals against the seal element 22 when the door is in place closing opening 12.

The access door 16 is held in place covering the access opening 12 by a pair of retainer straps 44. Each retainer strap has a generally channel shaped boy and flanges extending along each side edge. One end of each retainer strap is bent inwardly and terminates in a foot 46 for contact with the outside surface of the duct wall 14. Each strap 44 has an opposite inturned end 48 which confronts the outside surface of the main door panel 34. The channel shaped configuration of the retainer straps 44 and the side flanges enhance the rigidity of the retainer straps and makes them less susceptible to bending.

A threaded adjustment screw 50 extends through each retainer strap 44 and is threaded through a nut 52 (see FIG. 3) which is welded to the inside surface of the main door panel 34. The nuts are located adjacent to the opposite sides of panel 34. Each screw has a knurled knob 54 to facilitate its adjustment.

In practice, the access opening 12 can be formed using door 16 as a pattern. Holding the door against the outside of the duct wall 14 at the location selected for each access opening 12, a scribe mark can be formed on the duct wall around the door, and the access opening 12 can then be cut in the duct wall along the scribe mark. This assures that the access opening 12 has the same size as the access door 16.

Each door is accompanied by a length of the gasket 18 sufficient to extend completely around the access opening 12 on its edge 12a. The gasket 18 is applied by pressing it onto the edge 12a with the inside flange 24 located on the inside of the duct and the outside flange 26 on the outside of the duct. The gasket is pressed onto edge 12a until the bight 28 contacts edge 12a. The angled fingers 32 do not interfere with application of the gasket and they help to hold it in place once it has been applied fully. The fingers 32 are deflected and tend to spring back against the duct wall in order to tightly grip against its inside and outside surfaces. This assures that the gasket 18 is securely retained in place on the duct in extension completely around the access opening 12.

The hard portion 20 of the gasket and particularly the rigid bight 28 and rib 30 strengthen and reinforce the exposed edge 12a and enhance its rigidity so that "chattering" and other objectionable noise will not be generated when the internal duct pressure changes. The hard portion 20 also serves to mount the gasket securely in place on the edge 12a with the soft seal element 22 projecting slightly into the duct and also into the opening 12. This decreases the effective size of opening 12 somewhat and makes it slightly smaller than the access door 16. When the gasket 18 is fully applied, its opposite ends are butted together to form a butt joint such as that indicated at 56 in FIG. 1.

Figure 3:
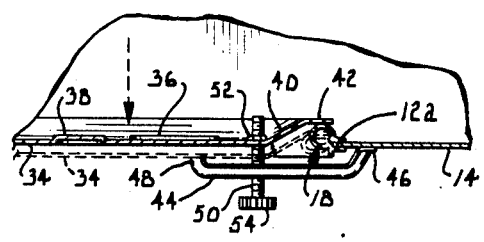
FIG. 3 is a fragmentary sectional view taken generally along line 3—3 of FIG. 2 in the direction of the arrows.

After the gasket 18 has been applied around the opening 12, door 16 is inserted into the duct through the access opening by angling it somewhat as it is passed through the opening. The retainer straps 44 are applied in the manner best shown in FIG. 3, with their feet 46 disposed against the outside surface of the duct wall 14 and their opposite inturned ends 48 located adjacent to the outside surface of the door panel 34. The adjustment screws 50 can be tightened as necessary to hold the door generally in place covering the access opening 12. The peripheral flange 42 of the door is located against the inside surface of the seal element 22, as best shown in FIG. 3.

Once the door has been applied in this manner, the air pressure within the duct acts against its inside surface to press the door outwardly, thus pressing the flange 42 against the seal element 22 more firmly with increasing air pressure in the duct. As the duct pressure increases, the effectiveness of the seal between the door and gasket increases because the door is pressed more tightly against the gasket. The soft and resilient nature of the seal element 22 allows it to deform when pressed against by the door and causes it to return to its original undeformed condition when the duct pressure is low or absent.

Due to the use of the air pressure in the duct for holding the access door 16 against the gasket, the retainer straps 44 need only generally hold the access door in place on the opening 12. The bottom portion of the slanted wall 40 prevents the door from inadvertently sliding downwardly to expose the opening. Also, the retainer straps 44 can be tightened sufficiently to prevent the door from slipping out of place. The straps 44 can be quickly and easily released for removal of the door when access to the duct is required.

Although the access door 16 is constructed entirely of sheet metal, it exhibits the necessary strength due to its stepped configuration (and for larger doors, due to the presence of the ribs 36 and boss 38). At the same time, the strength and rigidity of the hard portion 20 of gasket 18 gives the exposed edge 12a sufficient strength to eliminate chattering and other objectionable noise caused by pressure changes in the ductwork.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. An access door construction for closing an access opening in a sheet metal ventilating duct conveying air under pressure, said opening having an exposed sheet metal edge, said door construction comprising:

a sheet metal door panel having a size to substantially cover the access opening and a peripheral sealing surface;

a gasket having a generally U-shaped hard portion providing spaced apart flanges applicable to said exposed edge with one flange inside the duct and the other outside the duct and a rigid rib interconnecting said flanges and spanning the exposed edge to reinforce and rigidify same, said gasket also including a relatively soft compressible sealing element extending from said hard portion substantially continuously around the access opening and projecting into the duct when said gasket is applied thereto; and releasable means for retaining said door panel on the duct in a position to cover the access opening with said peripheral sealing surface of the door panel located inside of the duct and pushing outwardly against said sealing surface of the door panel located inside of the duct and pushing outwardly against said sealing element to effect a seal around the access opening, whereby the pressure in the duct acts against said door panel to enhance the effectiveness of said seal.

2. The invention of claim 1, including a plurality of flexible fingers on each of said flanges for contact with the duct to assist in holding said gasket thereon.

3. The invention of claim 2, wherein the fingers on each flange have free tips which overlap with free tips of the fingers on the other flange.

4. The invention of claim 1, wherein said releasable means comprises:

a pair of retaining elements each having one end engageable with the duct exteriorly thereof; and a threaded member for each retaining element, each threaded member extending through the corresponding retaining element and having a threaded connection with said door panel.

5. The invention of claim 1, wherein said door panel includes:

a generally planar main panel;

a wall portion extending from said main panel; and a peripheral flange extending from said wall portion and occupying a plane offset from said main panel, said flange presenting said sealing surface thereon and being integral with said main panel and said wall portion.

6. The invention of claim 5, wherein said main panel, wall portion and flange are formed from thin sheet metal.

7. An access door construction for a sheet metal air distribution duct having an access opening bounded by an exposed sheet metal edge, said door construction comprising:

a door panel having a size to substantially cover the access opening, said door panel being formed of thin sheet metal and having a substantially flat peripheral surface;

a gasket having a relatively hard portion applicable to the exposed edge of the access opening to mount the gasket on the duct with said hard portion reinforcing the exposed edge and enhancing the rigidity thereof, said gasket having a relatively soft compressible sealing element extending substantially continuously around the opening and projecting into the duct when said hard portion is applied to said exposed edge, said sealing element being constructed of softer material than said hard portion of the gasket; and releasable retaining means for retaining said door panel on the duct in position to cover the access opening with said peripheral surface of the panel located inside of and against said sealing element to form a seal around the access opening, whereby air under pressure in the duct acts against said door panel to enhance the effectiveness of said seal.

8. The invention of claim 7, wherein said door panel has a stepped configuration and includes a main panel occupying a plane offset from said peripheral surface.

9. The invention of claim 8, including a wall portion extending between and integral with said main panel and said peripheral surface.

10. The invention of claim 7, wherein said hard portion of the gasket includes a pair of generally parallel flanges spaced apart and interconnected by a bight, said flanges being engageable against inside and outside surfaces of the duct with said bight spanning the exposed edge of the access opening to mount the gasket on the duct.

11. The invention of claim 10, including a stiffening rib extending beyond one flange and forming a continuation of said bight.

12. The invention of claim 10, including a plurality of flexible fingers projecting from each flange for gripping against the duct surface.

13. A door construction for an access opening in a sheet metal duct conveying air under pressure, said door construction comprising:

a sheet metal access door having a main panel and a wall portion extending from said main panel, said door also having a peripheral flange extending from said wall portion and presenting a generally flat sealing surface in a plane offset from said main panel, said main panel, wall portion and flange being integral with one another and cooperating to provide the door with a stepped configuration;

a deformable seal element;

means for mounting said seal element on the duct in extension substantially continuously around the access opening; and releasable means for retaining said access door on the duct in position to cover the access opening with said sealing surface of the flange located inside of and pressed against said seal element to effect a seal around the access opening, whereby the pressure in the duct presses said sealing surface against the seal element to enhance said seal.

14. The invention of claim 13, wherein said mounting means includes a relatively rigid element connected with said seal element and having a pair of generally parallel flanges, said flanges being applicable to inside and outside surfaces of the duct with said bight spanning an exposed edge of the access opening to mount said seal element on the duct.

15. The invention of claim 14, including a plurality of flexible fingers on each of said flanges for gripping against the duct surfaces.

* * * * *